United States Patent
Aswell et al.

[19]

[11] Patent Number: 6,031,217
[45] Date of Patent: *Feb. 29, 2000

[54] APPARATUS AND METHOD FOR ACTIVE INTEGRATOR OPTICAL SENSORS

[75] Inventors: Cecil J. Aswell, Orangevale, Calif.; John H. Berlien, Jr., Plano; Eugene G. Dierschke, Dallas, both of Tex.

[73] Assignee: Texas Instruments Incorporated, Dallas, Tex.

[ * ] Notice: This patent is subject to a terminal disclaimer.

[21] Appl. No.: 09/002,904

[22] Filed: Jan. 5, 1998

Related U.S. Application Data

[60] Provisional application No. 60/034,531, Jan. 6, 1997.

[51] Int. Cl.[7] .................................................. H04N 1/00
[52] U.S. Cl. .................................. 250/208.1; 250/214 A; 358/406
[58] Field of Search .......................... 250/208.1, 214 A, 250/226; 358/406; 348/223, 222

[56] References Cited

U.S. PATENT DOCUMENTS

| | | |
|---|---|---|
| 5,208,531 | 5/1993 | Aton .......................................... 324/754 |
| 5,448,056 | 9/1995 | Tsuruta ..................................... 250/214 A |
| 5,559,470 | 9/1996 | Laber et al. ............................... 330/252 |

OTHER PUBLICATIONS

"TSL 1401 128×1 Linear Sensor Array with Hold," Texas Instruments Incorporated, SOES029—Jun. 1996.

Optoelectronics, "400 DPI Linear Image Sensor with Electronic Shutter Capability," Oct. 1996.

*Primary Examiner*—Edward P. Westin
*Assistant Examiner*—Thanh X. Luu
*Attorney, Agent, or Firm*—Mark E. Courtney; W. James Brady III; Richard L. Donaldson

[57] ABSTRACT

Active integrator optical sensor (13) having a photodetector (56) and an active integrator circuit. The active integrator circuit having an operational amplifier (50), an integrating capacitor (51) an offset capacitor (54) and a store capacitor (52). The active integrator circuit operating to integrate the electrical signal from photodetector (56).

19 Claims, 4 Drawing Sheets

APPARATUS AND METHOD FOR ACTIVE INTEGRATOR OPTICAL SENSORS

CROSS-REFERENCE TO RELATED PATENTS APPLICATIONS

This application claims priority under 35 USC § 119(e)(1) of provisional application Ser. No. 60/034,531 filed Jan. 6, 1997. This patent is related to the following co-pending patent applications: Ser. No. 09/002,731, entitled *Apparatus and Method for a Managed Integration Optical Sensor Array*, Attorney's Docket TI-23302; and Ser. No. 09/002,639, entitled *Apparatus and Method for Normalizing Multiple Color Signals*, Attorney's Docket TI-24772. Each of the above entitled co-pending applications is assigned to Texas Instruments Incorporated.

TECHNICAL FIELD OF THE INVENTION

This invention relates generally to optical sensors, and more particularly to an active integrator and method for an active integrator optical sensor.

BACKGROUND OF THE INVENTION

Optical sensors are used in a number of applications ranging from scanning a bar code on a package or digitizing a document for display or printing to optical communications systems. Optical sensors generally operate by detecting electromagnetic energy and producing an electrical signal that corresponds to the intensity of the electromagnetic energy striking the optical sensor. Multiple optical sensors are generally used and are often geometrically positioned in arrays with individual optical sensor corresponding to a respective pixel in the resulting electronic display (the term pixel and optical sensor as used in the art and as used in this application are interchangeable). Such arrays allow a larger spatial area to be scanned than could otherwise be performed by a single optical sensor. Other applications may use raster scan techniques in which fewer optical sensors are needed but an object or spatial area is scanned in an incremental pattern until the object or spatial area is completely scanned.

An electrical signal from each optical sensor is typically conditioned by an output modifier. The output modifier conditions the signal or converts the electrical signal into an output signal that can be easily understood by a computer processor. The function of the output modifier may be performed by a charge to voltage amplifier or an analog to digital (A/D) convertor.

The output signal from the output modifier, corresponding to a respective optical sensor is next processed in a manner consistent with the specific application. In one application, a computer processor may function as a signal processor that assembles the various output signals and displays or prints the resulting picture. In another application, a computer processor could use the output signal to stop a conveyor belt when groceries have been moved up to the check-out register. The applications in which optical sensors can be used is without bound.

An optical sensor array generally comprises multiple photodetectors and an electrical circuit corresponding to each individual photodetector. The photodetector produces an electrical signal in proportion to the electromagnetic energy striking the photodetector. The electrical circuit stores the electrical signal produced by the photodetector. The optical sensor array may also include a timing circuit that provides a timing sequencing for internal and external operation of the optical sensor array. In addition, the optical sensor array may incorporate an output modifier that conditions the electrical signal into a usable form for a signal processor such as a general purpose computer processor.

The photodetector generally detects electromagnetic energy in a specific bandwidth that is optimized for each application. Photodetectors can be manufactured from different materials and by different processes to detect electromagnetic energy in varying parts of the electromagnetic spectrum and over varying bandwidths within the spectrum. In order to provide an optimal amount of electromagnetic energy for the optical sensor to detect, a source of electromagnetic energy is often utilized in the form of a light or laser; however, there is no requirement that a source of electromagnetic energy be incorporated. One of the most often used photodetectors is the photodiode.

Optical sensors may be manufactured in many semiconductor technologies including MOS (Metal Oxide Semiconductors), CMOS (Complementary MOS), I2L, J-FET, or Bi-CMOS. Each of the manufacturing technologies have trade offs with respect to performance, manufacturing cost, and required associated supplies and interface circuits. Optical sensors have previously been manufactured based on CCD (Charge Coupled Device) technology. Generally CCD's require a dedicated process technology, require multiple supplies, require more complicated interface electronics, and have limited capability for integrating other electronic functions and are generally more expensive than the other available technologies.

One type of optical sensor often used in non-CCD technologies includes a passive integrator electrical circuit. In the passive integrator, a photodiode (and its associated junction capacitance and attached parasitic capacitance) are prebiased to a high reverse voltage. The photodiode generates a photocurrent which discharges the capacitance, thereby causing the voltage to decrease. The output voltage for this type of optical sensor is generally non-linear with respect to the integrated charge since the diode capacitance is a function of the diode voltage.

A further disadvantage of the passive integrator is that the integrating capacitance (photodiode and parasitic capacitances) is determined primarily by the photodiode size. Thus sensitivity cannot be increased by increasing the photodiode size since the capacitance will increase approximately proportionally.

A further disadvantage of the passive integrator is that the high reverse voltage during operation will cause dark current to flow even in absence of light. The diode current is given by the following equation:

$$I = I_s\left(e^{\frac{qV}{kT}} - 1\right) - I_p$$

where:

$I_s$ is the saturation current, q is a constant,

V is the diode voltage, k is a constant,

T is the temperature in degrees Kelvin, and $I_p$ is the photodiode current generated by incident light.

For large reverse diode voltage $$\left(V \gg \frac{kT}{q}\right),$$

$$I = -(I_s + I_p)$$

The dark current in absence of light is $-I_s$ for large reverse diode voltage. This dark current doubles every 6–10 degrees Kelvin. For high sensitivity applications, the dark current can be comparable to the photodiode current for high temperature applications. A high dark current diminishes the usable data that can be obtained from the optical sensor. Also, variations of the dark current between photodiodes in an array due to process variation will cause an output non-uniformity.

SUMMARY OF THE INVENTION

Accordingly, a need has arisen in the art for an improved optical sensor. The present invention provides an active integrator electrical circuit for use with an optical sensor that addresses shortcomings of the prior optical sensors.

In accordance with teachings of the present invention, an active integrator optical sensor may include a photodetector and an active integrator electrical circuit. The active integrator may use an operational amplifier ("op amp") and an integrating voltage storage device as its main constituent parts. Additional voltage storage devices, switches and other components may be used in the active integrator electrical circuit to reduce an offset voltage across the photodetector, store an integrated result on a voltage storage device, and provide a timing sequence for the circuit.

An optical sensor incorporating teachings of the present invention will preferably operate in a cycle. The integrate and store portion of the cycle occurs when the active integrator electrical circuit stores a charge that is proportional to the electrical signal received from the photodetector. At the conclusion of this portion of the cycle, the stored charge is sent to an output modifier. The offset voltage correction and hold portion of the cycle is then initiated when the inputs to an associated op amp are either shorted together or connected to a common reference voltage. A voltage proportional to an offset between the op amp inputs is stored on an offset voltage storage device. When the common reference voltage or short between the inputs is removed, the offset correction voltage stored on the offset voltage storage device is used to cancel the offset present across the inputs to the op amp. The process of canceling the offset occurs within the op amp. The op amp may include any method of offsetting a correction voltage that is known in the art, including digital offset correction or capacitor offset correction. The offset correction effectively cancels out both the offset voltage across the op amp and the photodetector during the integrate and store portion of the cycle. The preferred embodiment of the present invention uses capacitor offset for offset correction in the op amp.

The active integrator architecture allows for each photodetector in an array to have a corresponding active integrator circuit such that the photo currents from the photodetector are integrated by each associated active integrator and stored on the store voltage storage device. The voltage stored on the store voltage storage device is transferred to the output modifier that conditions the voltage signal in a manner consistent with the requirements of an associated computer processor.

For some applications, embodiments of the present invention may be preferably manufactured using CMOS technology. This allows the optical sensor to be manufactured in a technology that is much cheaper than the prior art which needed the performance characteristics of CCD technology to function. However, other technologies may be used to manufacture an optical sensor using an active integrator architecture in accordance with teachings of the present invention.

In a preferred embodiment, one or more photodiodes are used as a photodetector and the voltage storage devices are each a capacitor. The present invention teaches that the integrating capacitor used for the integrating voltage storage device is matched to the specific photodetector to provide optimal sensitivity to the electromagnetic energy in the desired bandwidth. By decreasing the associated integrating capacitance, the sensitivity of the optical sensor is increased. In applications where the intensity of the electromagnetic energy striking the photodetector is high, the capacitance of the integrating capacitor can be increased to correspond to increased electrical signal strength from the photodetector, thereby optimizing the resulting optical array for the specific application in which it is used.

Technical advantages of the present invention include varying the ratio of capacitances of the storage capacitor with respect to the integrating capacitor. This will have the effect of increasing the strength of the electrical signal output from the active integrator. Thus, the ratio of capacitors acts as a gain amplifier or multiplier. Another technical advantage of the present invention is providing an active integrator which can be used to integrate currents from non-ideal current sources having a finite impedance or voltage compliance limitation, such as a photodiode. The active integrator architecture provides an electrical signal that is generally linearly proportional to the integrated photo current from the photodetector.

Another technical advantage of the present invention is providing an active integrator architecture to increase the strength of the electrical signal from each pixel as compared to the passive integrators. Since the integrating capacitor can be made arbitrarily small, the voltage/light sensitivity can be made arbitrarily large. The sensitivity of the optical sensor is not substantially affected by variations in the capacitance of the photodiode.

The present invention also has the technical advantage of maintaining a photodiode biased at a level close to zero, thereby reducing any associated dark currents. By resetting the output of the integrator to near zero prior to the start of each integration cycle, the dark level output of the circuit is sufficiently close to ground that dark level baseline restoration is not normally required. The result is a lower pixel-to-pixel dark level variation and also a reduction in dark current errors at elevated temperatures. In addition, the electrical signal from each optical sensor is referenced to ground or a DC reference voltage with no baseline or DC restoration required.

A further technical advantage of the present invention is that the dark current leakage in a photodiode is reduced by at least an order of magnitude, thereby reducing dark level errors and extending the maximum operation temperature limit of the associated optical sensor array. For variable temperature situations, the dark level currents may be reduced and the sensitivity increased by at least thirty times greater than with comparable techniques using reverse biased photodiodes, i.e. passive integrators, at a given maximum temperature. Similarly, for a given sensitivity, the active integrator architecture allows operating at about 30° C. higher temperature than the same photodetector using a passive integrator architecture.

The present invention has the additional technical advantage in that the use of an active integrator architecture results in a highly linear integrator, which corrects the problem of a passive integrator architecture that may produce a highly non-linear result when comparing the light received by the associated photodetector to the electrical signal from the respective passive integrator. The present invention also allows sampling the electrical signal output from each optical sensor at the same time instead of in series.

The present invention also has the technical advantage that charge amplification is not affected by variations in the value of the capacitors used in the charge amplifiers. The only requirement is that the value of the respective capacitors are matched.

An additional technical advantage of the present invention is that all pixel charges are converted to voltage by using a common capacitor in the output circuit. This has the effect of reducing the effects of capacitance variation across the optical sensor array.

A further technical advantage of the present invention is that the speed of the system is enhanced by keeping the photodiode biased at zero voltage so that a photo current is not required to charge the diode capacitance of the photodiode.

Other technical advantages will be readily apparent to one skilled in the art from the following figures, descriptions, and claims.

BRIEF DESCRIPTION OF THE DRAWINGS

For a more complete understanding of the present invention and the advantages thereof, reference is now made to the following descriptions taken in conjunction with the accompanying drawings in which.

DETAILED DESCRIPTION OF THE INVENTION

The preferred embodiments of the present invention and its advantages are best understood by referring in more detail to FIGS. 1–8 of the drawings, in which like names refer to like parts throughout the several views.

For purposes of this application the term "photodetector" includes any detector that responds to radiant energy; examples include photoconductive cells, photodiodes, photoresistors, photoswitches and phototransistors.

Figure 1:
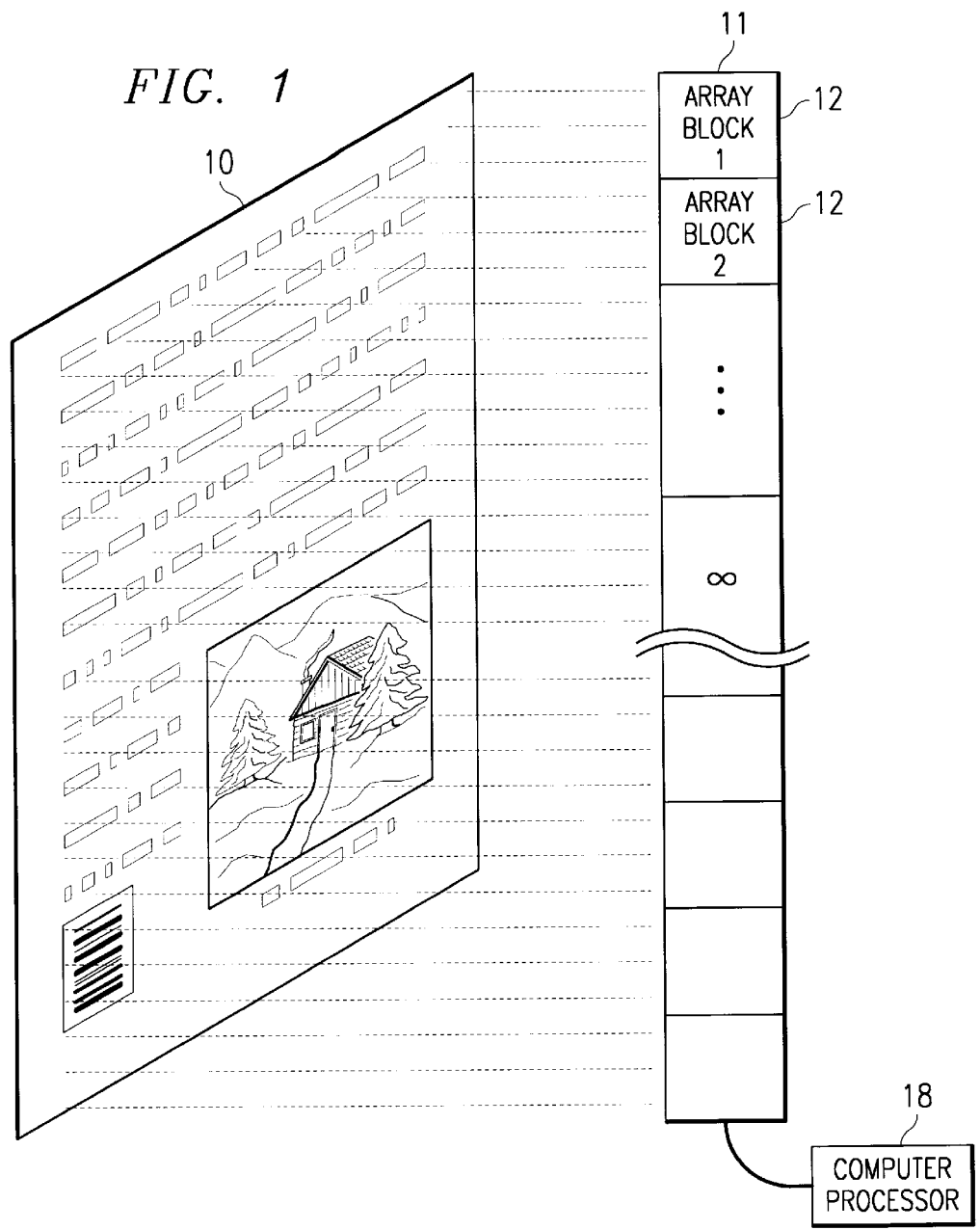
FIG. 1 is a schematic block diagram showing a document being scanned by a linear optical sensor array with each individual array blocks.

FIG. 1 is a schematic block diagram of optical sensor array 11 constructed in accordance with teachings of the present invention. During a typical scanning operation, optical sensor array 11 will detect electromagnetic energy reflected from or passing through document 10. Each optical sensor 13 (FIG. 2) in optical sensor array 11 produces an electrical output corresponding to such electromagnetic energy from document 10. Computer processor 18 may assemble the electrical output into an electronic map or picture of document 10 for display, printing, transmission or further processing.

Scanning document 10 can be accomplished by several methods. The most common scanning method is for document 10 to be scanned in increments or slices by an optical sensor array 11 that is of sufficient length that the entire length of document 10 is scanned in incremental slices. Another scanning method often referred to as rastering, scans document 10 incrementally both vertically and horizontally in a selected pattern until document 10 has been fully covered. Rastering often requires a smaller number of individual optical sensors.

Optical sensor array 11, as shown, is configured as a linear optical array. Optical sensor array 11 may, however, be configured in other geometric configurations, such as a general rectangular array (not shown) having multiple columns and rows of array blocks 12, or even a star geometric pattern (not shown) of array blocks 12.

Optical sensor array 11 is comprised of one or more array blocks 12. Electromagnetic energy passes through or is reflected by document 10. The electromagnetic energy striking optical sensors 13 correspond to specific locations on document 10 to be scanned. Each optical sensor 13 of optical sensor array 11 outputs an electrical signal that corresponds to the intensity of the electromagnetic energy striking the optical sensor 13. After obtaining an electrical signal from each optical sensor 13 in optical sensor array 11, document 10 or optical sensor array 11 is incrementally shifted to allow a different slice or segment of document 10 to be scanned. The electrical signal from each optical sensor 13 is conditioned by output modifier 17 (FIG. 3) in a manner consistent with the requirements of computer processor 18. A wide variety of signal processors may be satisfactorily used with electronic sensor array 11 in addition to computer processor 18. Output modifier 17 (FIG. 3) is generally a charge to voltage amplifier. However, output modifier 17 (FIG. 3) could also be an analog to digital (A/D) convertor. Computer processor 18 assembles each slice or segment to form an electronic map or picture of document 10.

The source of electromagnetic energy (not shown) can be any source of electromagnetic energy, including natural light and artificial light of many kinds such as coherent light from a laser.

Figure 2:
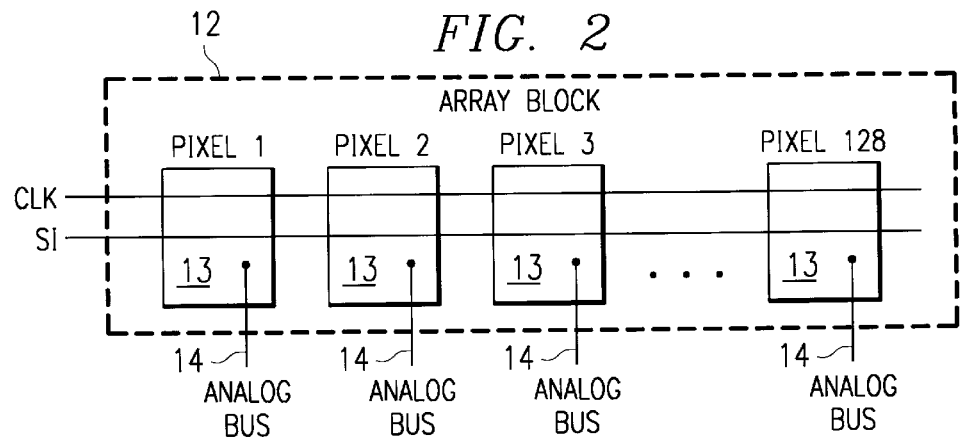
FIG. 2 is a schematic block diagram of an array block incorporating teachings of the present invention having a clock signal and an input with each pixel having an electrical signal output.

FIG. 2 shows the constituent elements of each array block 12. Each array block 12 contains multiple optical sensors 13 having a M×N configuration within the respective array block 12. Each optical sensor 13 may sometimes be referred to as a pixel in array block 12 since each optical sensor 13 produces an electrical signal corresponding to a respective pixel in the resulting electronic display. The number of pixels varies depending on the application. However, a preferred embodiment of the present invention includes 128 pixels 13, in each array block 12. Each optical sensor 13 has an input clock signal ("CLK") and an input start signal ("SI"). Clock signal "CLK" is common to all optical sensors 13. However, input start signal "SI" can be specific to each optical sensor 13 or common to all optical sensors 13 within array block 12. In addition, each individual optical sensor 13 has its output connected to analog bus 14 which allows each optical sensor 13 to be measured simultaneously or in series.

Figure 3:
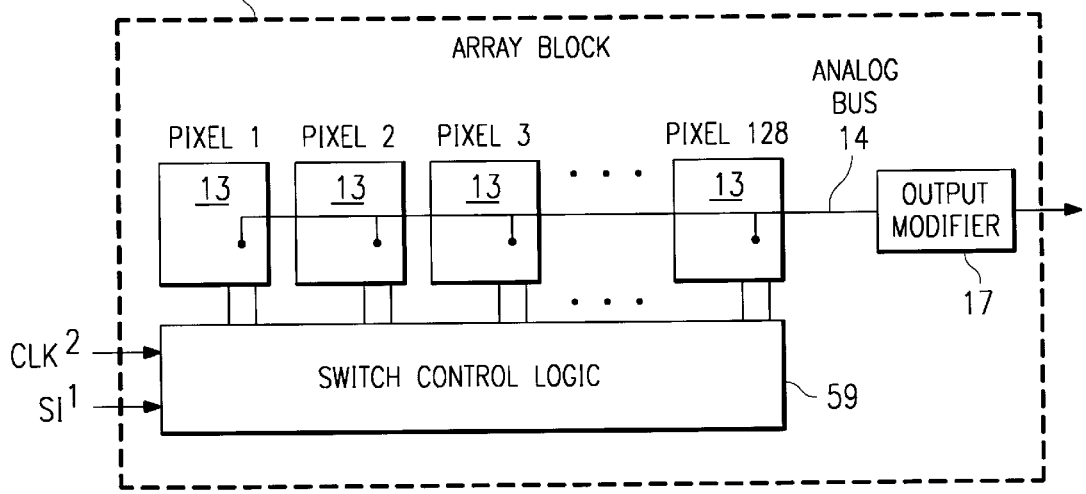
FIG. 3 is a schematic block diagram showing an array block containing the representative pixel elements controlled by switch controlled logic, each pixel being output into an output modifier.

FIG. 3 is a schematic block diagram showing one embodiment of the present invention. Array block 12 contains optical sensors 13 controlled by switch control logic 59 such that the output signal of each optical sensor 13 is connected to analog bus 14 and is conditioned by output modifier 17. Switch control logic 59 operates to control the internal and external timing of each array block 12. This may include controlling the individual integration periods for each optical sensor 13, queuing each optical sensor 13 for its respective output signal and resetting each optical sensor 13. As previously discussed, output modifier 17 will preferably condition the output signal from each optical sensor 13 as required by computer processor 18 (FIG. 1).

Figure 4:
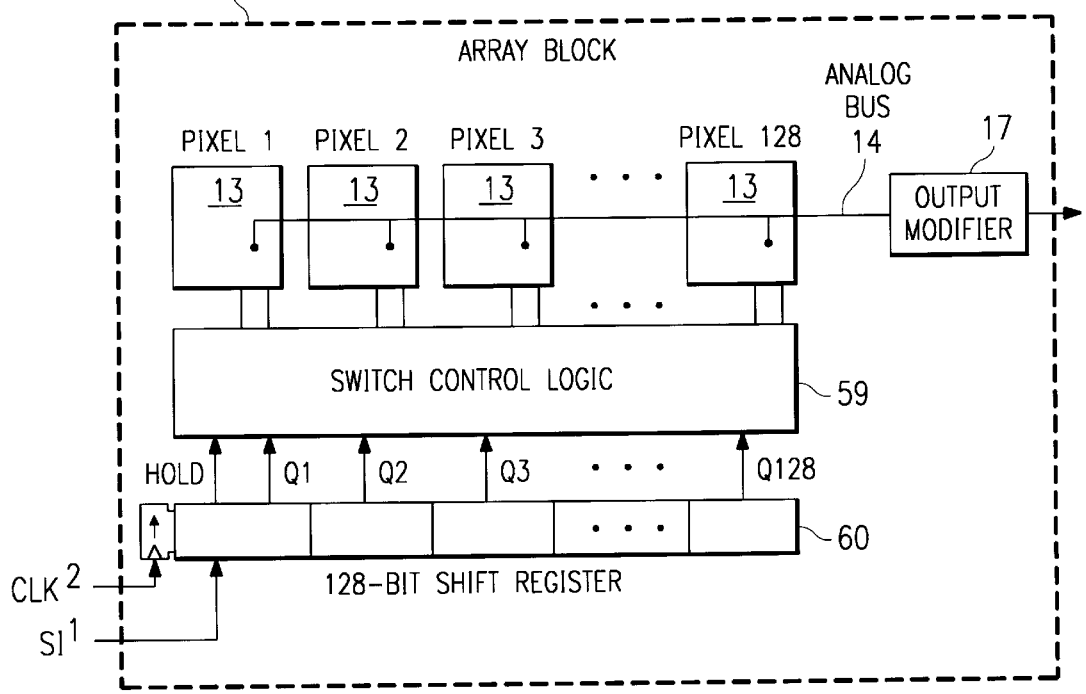
FIG. 4 is a schematic block diagram of the preferred embodiment of the present invention showing each array block having each individual pixel being controlled by switched controlled logic and a 128-bit shift register.

FIG. 4 is a schematic block diagram showing an alternative embodiment of the present invention. This figure shows the addition of bit shift register 60 within sensor array block 12. Bit shift register 60 is an address pointer that controls which optical sensor 13 is to be sampled. In one embodiment, optical sensor 13 may include a store capacitor 52 which stores the output signal of optical sensor 13 and bit shift register 60 would control which store capacitor 52 is to be sampled. This embodiment offers the advantage of allowing the optical sensor 13 to be reset and begin an integrate and store period without waiting for the output from optical sensor 13 to be transferred to computer processor 18 (FIG. 1).

As previously discussed, switch control logic 59 would control the internal and external timing of array block 12. The output from optical sensor array 11 may be transferred to computer processor 18 (FIG. 1) by multiple methods. In one embodiment, the output is transferred serially over a single output line to computer processor 18 (FIG. 1). In another embodiment, the output is transferred in parallel through multiple output lines to computer processor 18 (FIG. 1).

In another embodiment of the present invention, switch control logic 59 could control the start time and ending time of the integration period. The integration period for all optical sensors 13 in optical sensor array 11 (FIG. 1) may integrate simultaneously. In yet another embodiment, switch control logic 59 could vary when each optical sensor 13 is in the integration period, thereby providing an optical sensor 13 in its integration period at all times.

Figure 5:
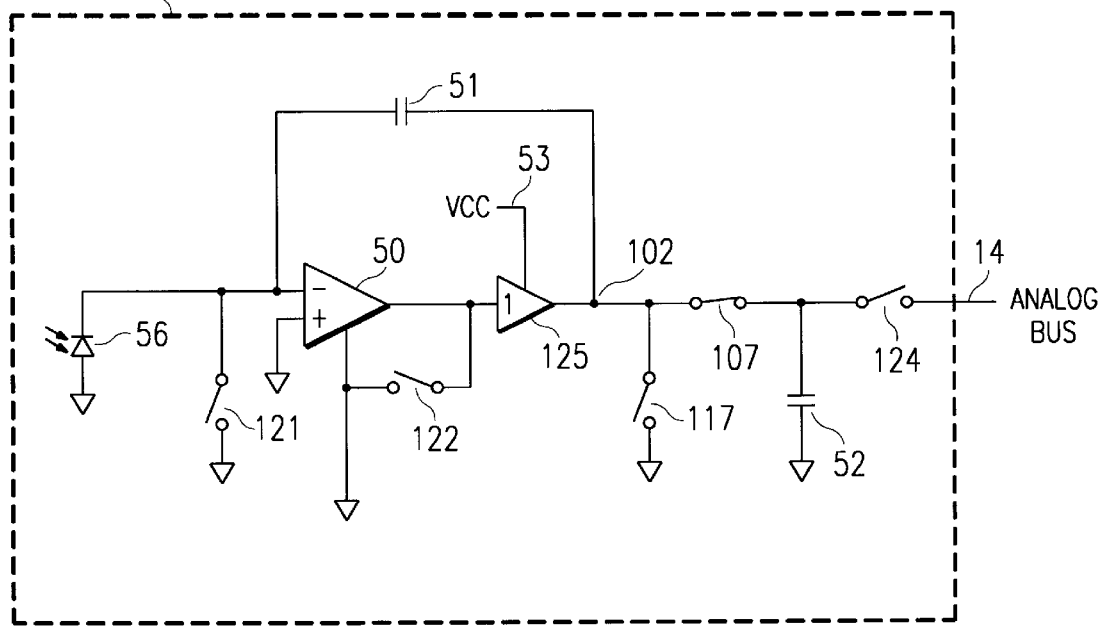
FIG. 5 is a schematic drawing showing one embodiment of an active integrator electrical circuit that has been utilized in prior versions of this architecture.
Figure 6:
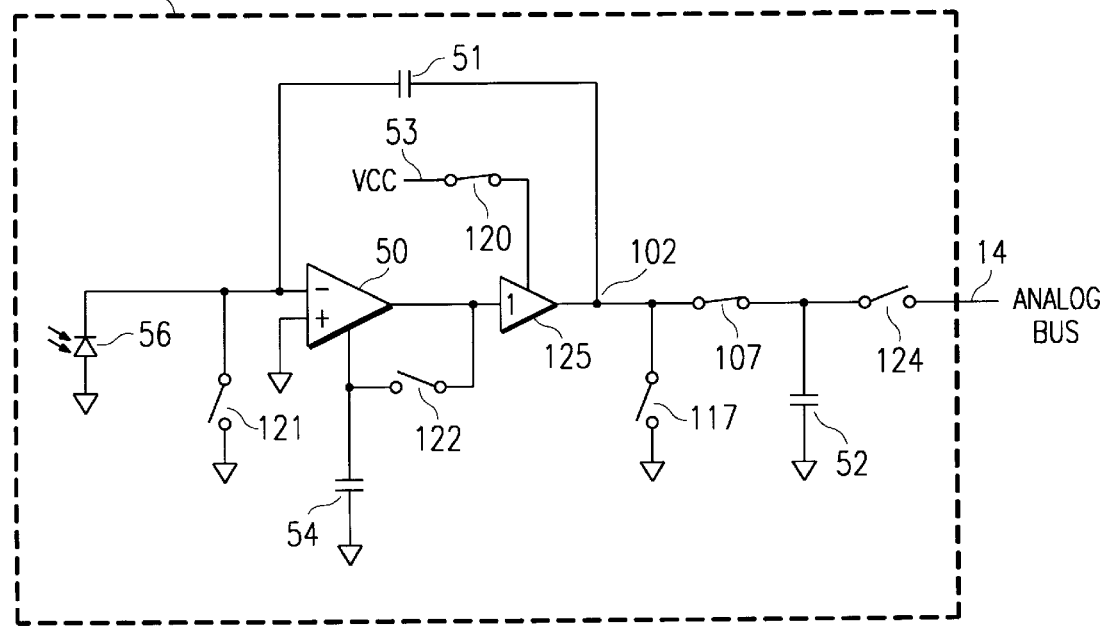
FIG. 6 is a schematic diagram of a preferred embodiment of the present invention showing the active integrator circuit.

FIG. 5 is a schematic block diagram of optical sensor 13 showing the active integrator circuit without an offset feature used in the present invention. FIG. 6, as drawn, shows active integrator optical sensor 13 incorporating the teachings of the present invention, in the integrate and store period or portion of the associated operating cycle. For purposes of explanation, it is assumed that an offset correction and hold period has previously taken place and an offset correction voltage is stored on offset capacitor 54. Output buffer 125 is active (switch 120 closed) and the voltage on store capacitor 52 is the same as the output at node 102 of the integrator (switch 107 closed).

The next time period or portion of the operating cycle is the offset correction and hold period. The preferred embodiment of the present invention uses capacitor offset correction and is described in further detail below.

To get to the offset correction and hold state from the integrate and store state, switch 107 is first opened so that the output at node 102 of the active integrator is stored on capacitor 52 and then switches 121, 117 and 122 are closed and switch 120 opened. The delay between opening switch 107 and actuating the other switches is in the order of a few nano-seconds and may be satisfactorily accomplished using conventional non-overlapping clock techniques.

Opening switch 120 disables output buffer 125. Closing switch 122 connects the output of op amp 50 to the offset cancellation feedback node. Closing switch 121 shorts the inverting input gate of op amp 50 and one end of integrating capacitor 51 to ground. Closing switch 117 shorts the other end of integrating capacitor 51 (node 102) to ground, thereby resetting the active integrator electrical circuit.

With both the inverting input and non-inverting input of op amp 50 at ground potential, the output of op amp 50 will drive the offset correction node (top of offset capacitor 54) such that the load currents for the input differential pair exactly match the currents through the differential pair. The effects of current mismatches due to random or systematic offsets are compensated for in this manner. Switch 122 is then opened, storing the offset correction voltage on offset capacitor 54. Switches 121 and 117 are then opened and switch 120 closed, activating the main integrator loop. The voltage at node 102 of the integrator is proportional to the photocurrent integrated since the end of the offset correction cycle, while the voltage on store capacitor 52 is representative of the previous integration period output. The voltage result of the previous integration cycle represented by the charge stored on store capacitor 52 is dumped onto analog bus 14 by closing switch 124.

After both the offset correction and hold period and the charge dump of store capacitor 52 has been completed the electrical circuit returns to the integrate and store state. The output voltage charge on store capacitor 52 may also have been dumped on analog bus 14 during the offset correction and hold period.

Although this embodiment is described in terms of having the non-inverting input of op amp 50 connected to ground and the various switches shorting everything to ground, a common DC reference voltage may be used instead of a ground.

Figure 7:
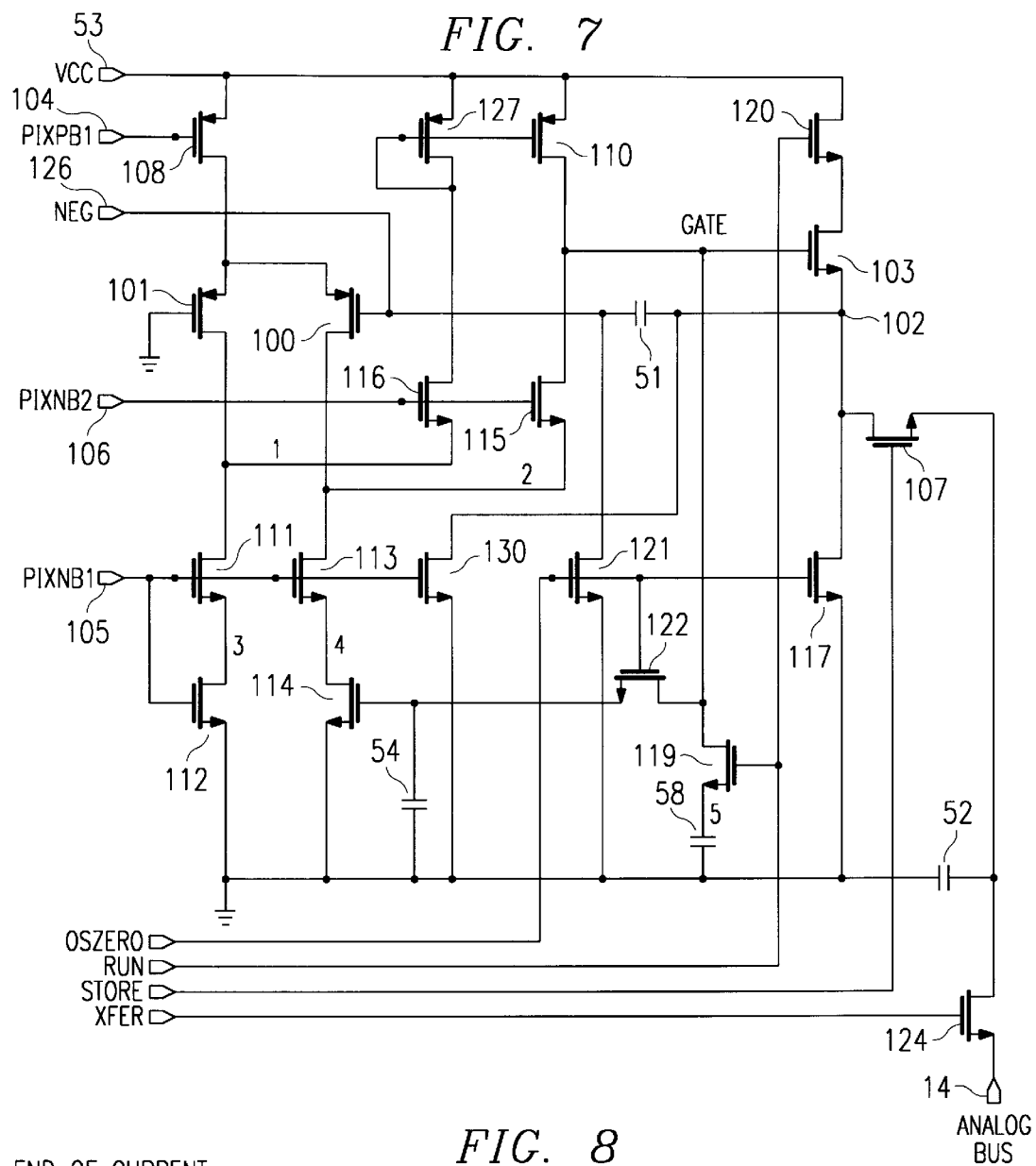
FIG. 7 is the schematic circuit diagram of a preferred embodiment of the present invention.
Figure 8:
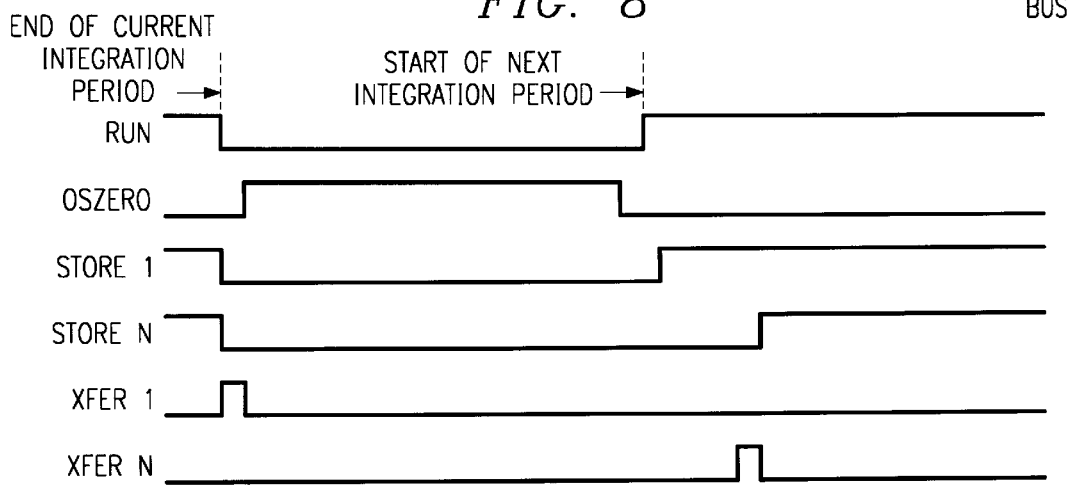
FIG. 8 is a timing diagram showing the internal operation of the circuit shown in FIG. 5.

FIG. 7 is a circuit diagram of the preferred embodiment of the present invention. Gate of device 100 (node NEG) is the inverting input of op amp 50 while gate of device 101 is the non-inverting input of op amp 50. The output of op amp 50 (node GATE) is the source to the gate of device 103. Integrating capacitor 51 is connected between node 102 and the inverting input (node NEG) of op amp 50 to form an integrator for integrating the photo current from photodiode 56. Input voltage sources 104, 105 and 106 are each bias voltages.

During the integration period signal STORE is high and signal XFER is low. The integrator voltage output at node 102 is applied to store capacitor 52 through switch 107. Assuming the offset voltage (which is the voltage across the photodiode 56) is negligible, the voltage across store capacitor 52 is the same as the voltage across integrating capacitor 51, therefore the charges on the two capacitors are proportional to their sizes. The circuit thus functions as a charge multiplication circuit, since generally store capacitor 52 is much larger than integrating capacitor 51. In addition, the store capacitor 52 generally consists of multiple unit capacitors (not shown) connected in parallel, with each unit capacitor the same size as the integrating capacitor 51 for good capacitor matching.

At the end of an integration and hold period, which can be as short as a few tens of microseconds to as long as hundreds of milliseconds, signal STORE goes low thereby storing the multiplied charge on store capacitor 52. At some later time signal XFER goes high, transferring the multiplied charge stored on store capacitor 52 to analog bus 14 which is connected to output modifier 17 (FIG. 2) which could be a charge coupled output amplifier or digital to analog converter or any other signal modifier.

After the integrator output (node 102) has been sampled the integrator is reset and the offset cancellation circuit is activated. To understand the detailed operation of this circuit first consider the operation of the basic op amp:

During the integration cycle, signals RUN and STORE are high. Signals OSZERO and XFER are low. Device 100 and device 101 are the differential input pair to op amp 50. Device 108 is a current source for the input differential pair (devices 100 and 101). Device 111 and device 112 constitute a constant current source. Assuming for the moment that device 113 and device 114 are also constant current sources with the same current as devices 111 and 112, it can be seen that together with the input differential pair (devices 100 and 101) and device 115 and device 116, this is a "folded cascode" circuit. Device 127 and 110 form an active current mirror load for the folded cascode output. Device 103 is a source follower with current source pull down device 130. Device 103 and device 130 form output buffer 125. Compensating capacitor 58 is connected to the high gain high impedance node GATE through device 119 and provides high frequency compensation for op amp 50.

An auto zero cycle is initiated after signal STORE goes low, to turn off switch 107 which disconnects store capacitor 52 from the integrator output at node 102. Next, signal RUN goes low, turning off switch 120 and device 119. This removes power from device 103 and disconnects compensation capacitor 58. Then, signal OSZERO goes high. This shorts both ends of integrating capacitor 51, and photodiode 56, to ground through switch 117 and switch 121. (Note that both inputs, gates of devices 100 and 101, of op amp 50 are now connected to ground.) This also shorts high gain node GATE to the gate of device 114 and offset capacitor 54 through switch 122, which closes a negative feedback loop. In this condition any imbalance in the drain currents of device 110 and device 115 due to offsets in the input pair (device 100 and device 101 of op amp 50), cascode pair or mirror pair will cause the loop to drive the gate of device 114 to a voltage such that the currents exactly balance.

After sufficient time has passed for the loop to settle (3–4 microseconds) OSZERO is brought low and the voltage that was present at the gate of device 114 is stored on offset capacitor 54. At the same time switch 121 and switch 117 are turned off removing the shorts from gate of device 100 and integrator output at node 102 to ground. A short time later RUN is brought high, reactivating the output source follower device 103 and compensating capacitor 58.

Since the circuit was brought to balance with both inputs, gates of devices 100 and 101, of op amp 50 connected to ground, the effects of any input offsets are canceled by the voltage stored on offset capacitor 54. In this manner the input offsets of the op amp 50 are effectively canceled out.

Note that in this implementation signals RUN and OSZERO may be common to all pixels in the array while signals STORE and XFER are generated locally at each pixel. This is illustrated in the simplified timing diagram in FIG. 8. This shows that all pixels are sampled and held at the same time at the end of an integration period (also the start of the auto zero/reset cycle) but are accessed in a serial fashion. All STORE signals go low at the same time but go high only after the pixel has been accessed (signal XFER goes high and then low) and after the auto zero cycle is completed.

Although the present invention has been described with several embodiments, various changes and modifications may be suggested to one skilled in the art. It is intended that the present invention encompass such changes and modifications as fall within the scope of the following claims.

What is claimed is:

1. An optical sensor for use in an optical sensor array to produce an electrical signal in response to electromagnetic radiation, comprising:

a photodetector having an output proportional to the intensity of the electromagnetic radiation incident with the photodetector; and an active integrator electrical circuit coupled with the output of the photodetector to accumulate and store the electrical signal from the photodetector, said active integrator electical circuit further comprising:

an operational amplifier having an offset correction, at least one non-inverting input, at least one inverting input and at least one output;

a reference voltage supplied to the electrical circuit;

the photodetector coupled to the operational amplifier inverting input and to the reference voltage;

an integrating voltage storage device coupled to the operational amplifier inverting input and to the operational amplifier output for storing an accumulated electrical signal from the photodetector;

a store voltage storage device coupled to the operational amplifier output and to the reference voltage for storing a voltage proportional to the voltage stored on the integrating voltage storage device; and an output bus coupled to the store voltage storage device; and the operational amplifier non-inverting input coupled to the reference voltage.

2. The optical sensor of claim 1, wherein the photodetector is a photodiode.

3. The optical sensor of claim 1, wherein the optical sensor is manufactured using CMOS technology.

4. The optical sensor of claim 1, wherein the active integrator electrical circuit further comprises a switch control circuit for controlling the timing of the active integrator.

5. An optical sensor for use in an optical sensor array to produce an electrical signal in response to electromagnetic radiation, comprising:

a photodetector having an output that is proportional to the intensity of electromagnetic radiation impinging the photodetector;

an active integrator coupled to the output of the photodetector, the active integrator comprising:

an operational amplifier having offset correction;

an integrating voltage storage device coupled to the operational amplifier, operable to store an accumulated electrical signal from the photodetector during the accumulate and store cycle;

a offset voltage storage device coupled to the operational amplifier, operable to store a voltage during the offset cycle for operational amplifier offset correction;

a store voltage storage device coupled to the operational amplifier, operable to store the voltage proportional to the voltage stored on the integrating voltage storage device; and a reference voltage coupled to the operational amplifier, operable to provide a constant voltage potential to the circuit; and a switching logic circuit connected to the photodetector and the active integrator, operable to control the timing of the active integrator.

6. The optical sensor of claim 5, wherein the photodetector is a photodiode.

7. The optical sensor of claim 5, wherein the integrating voltage storage device is a capacitor.

8. The optical sensor of claim 5, wherein the offset voltage storage device is a capacitor.

9. The optical sensor of claim 5, wherein the store voltage storage device is a capacitor.

10. The optical sensor of claim 5, wherein the optical sensor is manufactured using CMOS technology.

11. The optical sensor of claim 5, wherein the capacitance ratio of the store voltage storage device to the integrating voltage storage device results in a charge multiplication.

12. The optical sensor of claim 5, wherein the integrating voltage storage device is matched to the photodetector to provide optimal sensitivity of the optical sensor.

13. The optical sensor of claim 5, wherein the capacitance of the integrating voltage storage device is much smaller that the capacitance of the photodetector.

14. The optical sensor of claim 5, wherein the reference voltage comprises ground.

15. The optical sensor of claim 5, wherein the reference voltage comprises a DC voltage.

16. A method of forming an optical sensor array having a plurality of optical sensors which respond to incident electromagnetic radiation, comprising the steps of:

fabricating each optical sensor from a photodiode having sensor signal output and coupling the sensor signal output from each photodiode with an active integrated electrical circuit;

supplying a reference voltage to each optical sensor;

forming the active integrated electrical circuit with an operational amplifier having a non-inverting input, an inverting input and an operational amplifier output wherein the sensor signal output from the photodiode is coupled to the operational amplifier non-inverting input and the operational amplifier inverting input is coupled to the reference voltage;

forming the active integrated electrical circuit with an integrating capacitor coupled to the operational amplifier negative input and to the operational amplifier output; and forming the active integrated electrical circuit with an offset capacitor coupled to the operational amplifier and the reference voltage.

17. The method of forming the optical sensor array of claim 16, wherein the step of fabricating each optical sensor with an active integrated circuit further comprises the step of matching the integrating capacitor to the photodiode to provide optimal sensitivity of the optical sensor.

18. The method of forming the optical sensor array of claim 16, further comprising the steps of:

forming the active integrated circuit with a storage capacitor; and matching the capacitance of the integrating capacitor to the storage capacitor to multiply the charge on the storage capacitor.

19. The method of forming the optical sensor array of claim 16, further comprising the step of manufacturing the optical sensor array using CMOS technology.

* * * * *